United States Patent [19]
Ziefle

[11] 3,876,017
[45] Apr. 8, 1975

[54] SCALE CONSTRUCTION

[75] Inventor: Martin Ziefle, Balingen, Wurttemberg, Germany

[73] Assignee: Bizerba-Werke Wilhelm Kraut KG, Balingen, Wurttemberg, Germany

[22] Filed: Sept. 6, 1973

[21] Appl. No.: 394,722

[30] Foreign Application Priority Data
Sept. 8, 1972 Germany............................ 2244124

[52] U.S. Cl................................. 177/157; 177/184
[51] Int. Cl........................ G01g 23/02; G01g 21/10
[58] Field of Search ............ 177/157, 184, 187, 188

[56] References Cited
UNITED STATES PATENTS
837,496   12/1906   Osborne............................ 177/188

*Primary Examiner*—George H. Miller, Jr.
*Attorney, Agent, or Firm*—Michael S. Striker

[57] ABSTRACT

A scale has a balance lever arrangement, and a dashpot for damping the movements of the lever arrangement. The dashpot has an upright cylinder containing hydraulic fluid and provided at its upper open end with a cover through an opening of which a piston rod extends to the exterior, being there connected with the balance lever arrangement. In the interior of the cylinder a piston is connected with a piston rod. In normal damping operation the piston and piston rod can perform the strokes up to a maximum predetermined distance. When the balance lever arrangement is arrested, for storage or transportation, the piston and piston rod are forced to perform a movement greater than the aforementioned distance. The piston rod carries interiorly or exteriorly of the cylinder a sealing member which moves into abutment with the cover, closing the opening thereof to prevent storage of hydraulic fluid, when this greater movement is performed.

3 Claims, 3 Drawing Figures

SCALE CONSTRUCTION

BACKGROUND OF THE INVENTION

The present invention relates generally to a scale construction, and more particularly to a scale having a hydraulic dashpot.

There are certain types of scales, usually those wherein the balance lever system has to perform only relatively small movements during weighing operations, which are provided with hydraulic dashpots. The purpose of the dashpot is to dampen the normal movements of the scale mechanism. The prior-art dashpots have a dashpot cylinder which is closed everywhere except at the top, through which a piston rod extends from the exterior into the interior of the cylinder. The piston rod is kept as thin as possible, and the opening through which it extends into the interior of the dashpot is similarly kept as small as possible. Of course, the opening must be large enough to permit free sliding movement of the piston rod. In the interior of the cylinder the piston rod carries a piston and the cylinder of course accommodates hydraulic fluid. During the normal movements of the balance mechanism of the scale, the piston moves in the hydraulic fluid and, since the piston rod is connected with the balance scale mechanism exteriorly of the cylinder, the movements of the mechanism are thereby dampened.

It is clear from the above description that the prior-art arrangements perform their intended function, namely the dashpot dampens the movements of the balance mechanism of the scale. There are, however, many instances when the scale must be moved, for one reason or another, and as it is not always possible to maintain the scale during such movement in an orientation in which the opening through which the piston rod extends into the dashpot faces in strictly upward direction; it is quite a frequent occurrence that hydraulic fluid (usually oil) can be spilled from the interior of the dashpot through the opening through which the piston rod extends. Since this disadvantageously influences the operation of the dashpot, and may even mark the latter inoperative if enough fluid is lost, an attempt has been made in the prior art to avoid such spillage. This involves threading a conical sealing member from above onto the piston rod, against the exterior of the cylinder of the dashpot so as to overlie and seal the opening. Another approach known from the prior art is to use a sealing cord of suitable sealing material which is pressed into the free space surrounding the piston rod, to close the opening temporarily, and which is removed when the danger of spillage is terminated. Both of these sealing arrangement fulfill their intended purpose, but they are evidently cumbersome and time consuming, and moreover quite frequently may lead to damage to certain components, especially if the sealing elements are installed and/or removed by unskilled persons, because in each instance it is necessary to remove certain components of the scale in order to obtain access to the dashpot for the installation or removal of these priorart sealing arrangements.

A somewhat improved prior-art proposal suggests that the dashpots have a closed compartment into which the hydraulic fluid can flow when the scale of which the dashpot forms a part, is tilted or otherwise has its orientation changed so that an escape of the fluid can take place. The piston rod is introduced through a tubular component which is intended to prevent the escape of the fluid. This proposal, also, is not without its disadvantages, among which are its inability to prevent the escape of fluid when the scale is tilted beyond a certain extent out of its normal operating position, and the relatively great height of the dashpot construction itself.

SUMMARY OF THE INVENTION

It is, accordingly, an object of the invention to overcome the disadvantages of the prior art.

More particularly it is an object of the present invention to provide an improved scale construction which avoids the aforementioned disadvantages.

Still more specifically, an object of the invention is to provide such an improved scale construction wherein the dashpot can be reliably sealed against the escape of hydraulic fluid in a manner that can be handled even by an unskilled person without any danger of damage to the scale itself, and without any possibility that improper sealing might occur.

Another object of the invention is to provide such a scale construction wherein the sealing of the dashpot takes place in automatic response to the arresting of the scale balance mechanism which must in any case be arrested before the scale can be moved, to prevent damage to the balance mechanism.

In keeping with the above objects, and with others which will become apparent hereinafter, one feature of the invention resides, in a scale, in a combination which comprises balance lever means, and dashpot means for damping the movements of the balance lever means. The dashpot means comprises a hydraulic fluid-containing upright cylinder having an upper open end, and a cover extending across the open end and closing the same. The cover has an opening and a piston rod slidably extends with clearance through the opening and has an outer end connected to the balance lever means and an inner end in the cylinder. A piston is fast with the inner end and has freedom of movement to perform damping strokes of a predetermined distance axially of the cylinder towards and away from the cover. A sealing element is mounted on the piston rod and spaced from the cover by a different distance which is greater than the aforementioned predetermined distance, so as to engage the cover and close the opening to prevent spillage of hydraulic fluid in the event that movement of the piston equals the aforementioned greater distance.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
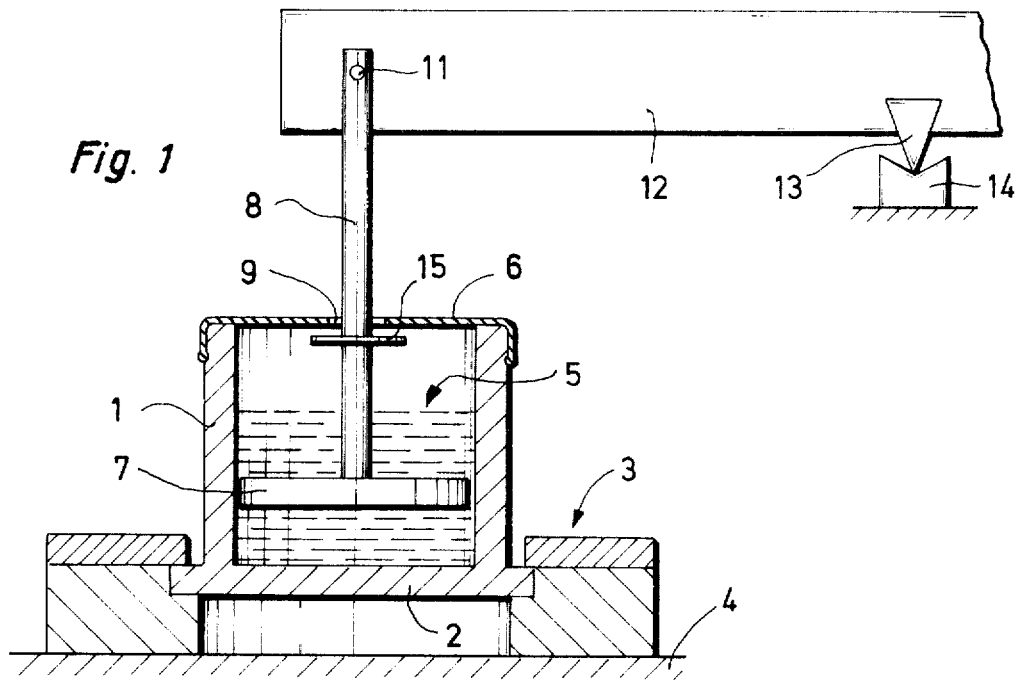
FIG. 1 is a fragmentary partially sectional detail view illustrating a part of the scale which embodies the present invention.
Figure 2:
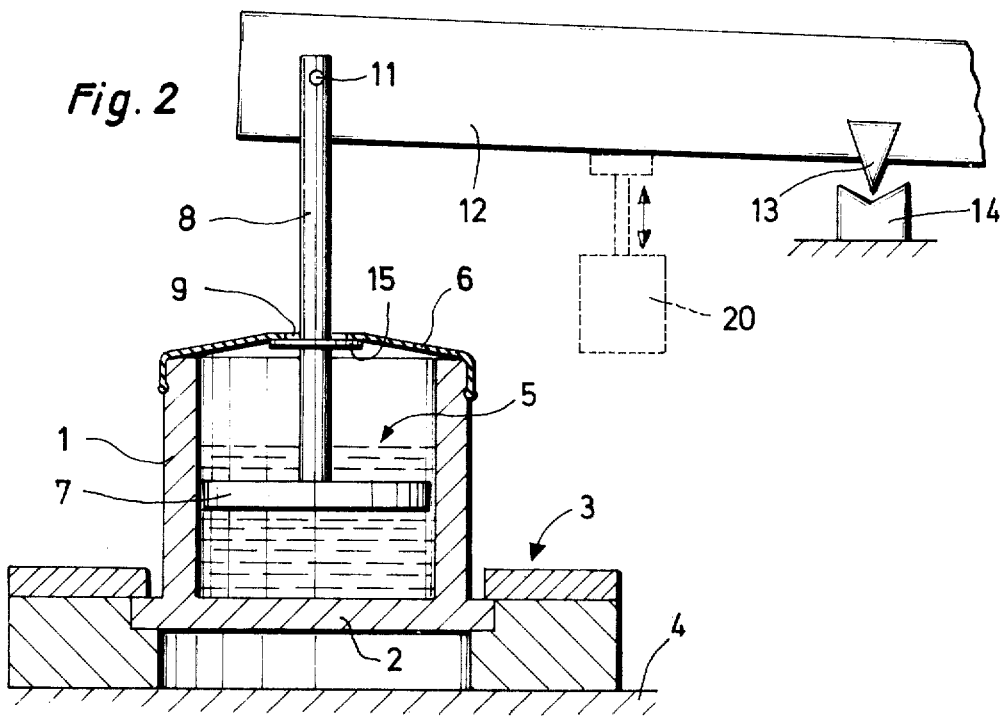
FIG. 2 is a view similar to FIG. 1, but illustrating the invention in operating condition

Discussing now the exemplary embodiment of FIGS. 1 and 2 in detail it will be appreciated that reference numeral 1 identifies an upright cylinder of a dashpot. The bottom wall 2 of the cylinder is connected by means of a diagrammatically illustrated holding device 3 to the similarly diagrammatically illustrated frame 4 of a scale. Details of the scale have not been shown because they are not of importance for an understanding of the present invention; the invention applies to all types of scales in which dashpots are used for damping the movements of the balance lever mechanism of the scale. For this reason only a part of a balance lever 12 has been illustrated, which is provided with a knife-edge balance 13 supported on a seat 14.

A body of hydraulic fluid 5, for instance oil, is accommodated in the interior of the cylinder 1 and the upper open end of the latter is closed by cover 6 which in the illustrated embodiment is in form of a flexible diaphragm. A piston 7 is movable up and down in the interior of the cylinder 1, being connected with the inner end of a piston rod 8 which extends upwardly and outwardly through an opening 9 in the cover 6. It is advantageous if both the configuration of the member 1 and that of the member 7 is cylindrical, with the inner diameter of the member 1 of course being somewhat larger than the outer diameter of the member 7, so that during the strokes of the member 7, that is the movement up and down, hydraulic fluid can be displaced from one axial side of the member 7 to the other, and vice versa. This operation is of course well known and provides the desired damping effect.

The upper end of the piston rod 8 is pivoted at 11 to a free end of the balance lever 12 so that, when the balance lever 12 pivots on the knife edge 13, the piston rod 8 and thereby the piston 7 will move either up or down, depending upon the direction in which the balance lever 12 pivots. This, then, results in the damping of the movements of the balance lever 12.

In accordance with the present invention there is provided on the piston rod 8 a sealing member 15, here configured as a washer or collar which is fixedly mounted on the piston rod 8. In the illustrated embodiment the sealing member 15 is located within the cylinder 1, but it should be understood that it could also be located outside the cylinder 1, as will be explained subsequently. The piston 7 can perform during the damping movement thereof a stroke of maximum predetermined length, that is, the distance through which it can move either up or down in the piston 1 during damping movements is predetermined by the maximum distance through which the balance lever 12 can pivot up or down. Accordingly, the sealing element 15 is so mounted on the piston rod 8 as to be spaced from the cover 6 by a distance which is greater than this maximum distance through which the piston 7 can normally move during its damping strokes. This is to assure that during these damping strokes the element 15 will not come into contact with the cover 6, because this would interfere with the damping strokes.

If, however, it is desired that the opening 9 be sealed against the escape and spillage of hydraulic fluid 5, for instance if the scale is to be transported, then the piston rod and the piston 7 are displaced upwardly by a distance which is greater than the normal stroke length, that is until the element 15 moves into sealing engagement with the cover 6, overlying and closing the opening 9. Of course, it is similarly possible to have the element 15 be located outside the cylinder 1, in which case piston rod 8 and piston 7 would have to be disposed downwardly until the element 15 would engage the cover 6 at the exterior side thereof to seal the opening 9. In either case, the spillage of hydraulic fluid through the opening 9 will be reliably prevented.

It is particularly advantageous if this movement into sealing engagement takes place in automatic response to the arresting of the balance lever mechanism against movement, since such arresting is necessary whenever the scale is to be moved in order to assure that the delicate components of the scale (for instance the cooperating components 13 and 14) do not become damaged during such movement. The arresting of the balance lever mechanism of the scale, and the means for carrying out such arresting, are already well known in the art. By way of example I have illustrated in FIG. 2 that a diagrammatically illustrated arresting device 20 may be employed, having a lifting member which can be moved up and down in the direction of the double-headed arrow. When it is moved up it engages the lever 12, raising it sufficiently so that the component 13 becomes disengaged from the component 14. The lever 12 is then fixed, i.e., arrested, in the position shown in FIG. 2.

The spacing of the element 15 from the cover 6 is so selected that the element 15 will engage the cover 6 and seal the opening 9 therein, when the lever 12 has been moved to the position shown in FIG. 2 by the arresting device 20. Thus, the opening 9 is sealed in automatic response to the arresting of the balance lever mechanism. Conversely, the opening 9 is freed and the dashpot returned to operative position in which it can dampen the movements of the balance lever mechanism, when the device 20 is operated to permit the components 13 and 14 to reengage and the balance lever mechanism to pivot again.

This arrangement is particularly advantageous because arresting devices such as the diagrammatically illustrated device 20 in FIG. 2, must be provided in most scales under all circumstances, so that in essence the additional structure and expense involved in providing the arrangement according to the present invention resides in the provision of the element 15 on the piston rod 8. This is evidently very inexpensive.

It will be appreciated that the effectiveness of the seal for the opening 9 will be improved if either the cover 6, the element 15 or both are elastically yieldable. For instance, either or both could be made completely or partially of synthetic plastic material, rubber or the like. In the illustrated embodiment I have chosen to show that the cover 6 could be in the form of an elastically yieldable diaphragm which is displaced upwardly when engaged in sealing position by the element 15. This affords a particularly good sealing effect.

However, it is of course possible to conversly have the cover 6 be of a rigid material, for instance metal or plastic, and to have the sealing element 15 be of an elastically yieldable material, for instance elastically yieldable synthetic plastic or rubber.

Figure 3:
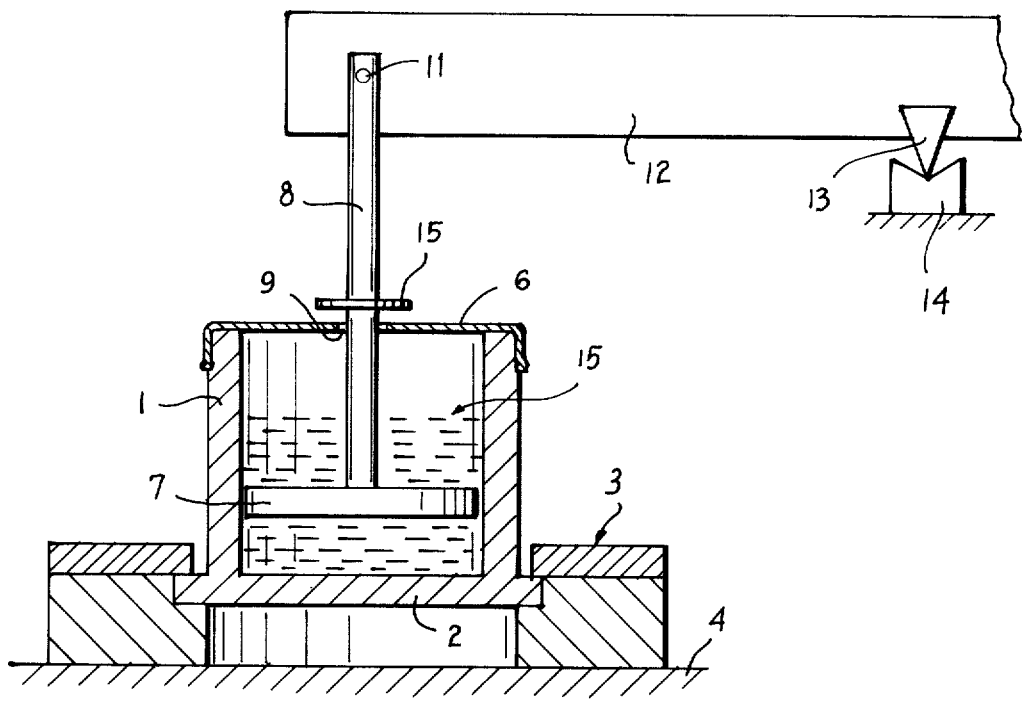
FIG. 3 is a view similar to FIG. 1 illustrating another embodiment of the invention.

The possibility of having the element 15 be located outside the cylinder 1, so that the piston rod 8 and the piston 7 must move downwardly in order for the element 15 to engage the cover 6, has been mentioned earlier and is illustrated in FIG. 3. It will be appreciated that this movement also can be readily combined with the arresting of the balance lever mechanism of the scale by an arresting device.

It will be understood that each of the elements described above, or two or more together, may also find a useful application in other types of constructions differing from the types described above.

While the invention has been illustrated and described as embodied in a scale construction, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a scale, a combination comprising balance lever means; dashpot means for damping the movements of said balance lever means, said dashpot means comprising a hydraulic fluid-containing upright cylinder having an upper open end, a cover comprising an elastically yieldable diaphragm extending across said open end and closing the same, said cover having an opening, a piston rod slidably extending with clearance through said opening and having an outer end connected to said balance lever means and an inner end in said cylinder, and a piston fast with said inner end having freedom of movement to perform damping strokes axially of said cylinder towards and away from said cover; a sealing element mounted on said piston rod and spaced from said cover by a distance so selected that said sealing element does not contact said cover during said damping strokes of said piston, and arresting means for moving said balance lever means to and arresting it in an inoperative position, with concomitant movement of said sealing element so as to engage said cover and close said opening to prevent spillage of hydraulic fluid while said balance lever means is in said inoperative position.

2. A combination as defined in claim 1, wherein said sealing element is located outside said cylinder, and said piston is compelled to move inwardly away from said cover when said arresting means is operated.

3. A combination as defined in claim 1, wherein said sealing element is at least in part composed of elastically yieldable material and forms a collar surrounding said piston rod, said sealing element being located within said cylinder and said piston being compelled to move toward said cover when said arresting means is operated.

* * * * *